US012783923B2

(12) United States Patent
Ramakrishnan

(10) Patent No.: US 12,783,923 B2
(45) **Date of Patent: *Nov. 3, 2026**

(54) SYSTEM AND METHOD FOR IMPROVING THE EFFICIENCY OF INPUTS TO QUANTUM COMPUTATIONAL DEVICES

(71) Applicant: FIRST QFM AB, Saltsjö-Boo (SE)

(72) Inventor: Visweswaran Ramakrishnan, North York (CA)

(73) Assignee: FIRST QFM AB, Saltsjö-Boo (SE)

( * ) Notice: Subject to any disclaimer, the term of this patent is extended or adjusted under 35 U.S.C. 154(b) by 960 days.

This patent is subject to a terminal disclaimer.

(21) Appl. No.: 17/952,935

(22) Filed: Sep. 26, 2022

(65) Prior Publication Data

US 2024/0104412 A1 Mar. 28, 2024

(51) Int. Cl.
*G06N 10/00* (2022.01)
*G06N 3/09* (2023.01)
(Continued)

(52) U.S. Cl.
CPC ............. *G06N 10/20* (2022.01); *G06N 3/094* (2023.01)

(58) Field of Classification Search
CPC ........ G06N 10/00; G06N 10/20; G06N 10/40; G06N 10/60; G06N 10/70; G06N 10/80; G06N 3/094; G06N 3/096
See application file for complete search history.

(56) References Cited

U.S. PATENT DOCUMENTS 11,601,265 B2 * 3/2023 Neven ...................... G06N 3/08
11,663,289 B1 * 5/2023 Batruni .................... G06N 3/04 706/62
(Continued)

FOREIGN PATENT DOCUMENTS

EP 4339847 A1 * 3/2024 ............. G06N 10/60
WO WO-2021041342 A1 * 3/2021 ........... G06V 20/698
(Continued)

OTHER PUBLICATIONS

Kim et al., "Classical to Quantum Convolutional Neural Network Transfer Learning", Aug. 31, 2022, ArXiv.com, pp. 1-15. (Year: 2022).*
(Continued)

*Primary Examiner* — Paulinho E Smith
(74) *Attorney, Agent, or Firm* — Peter J. Ims; Westman, Champlin & Koehler, P.A.

(57) ABSTRACT

A method and system are provided for training and deploying quantum foundation models to generate improved inputs for quantum computational devices. In one embodiment, training samples for a pretraining task (covering unitary matrices, quantum circuits, or microwave pulses) are automatically generated using low-complexity classical processes. A quantum foundation model is pretrained on these samples to capture device- agnostic structure associated with a family of quantum devices and the designated pretraining task. The pretrained model is then fine-tuned using a specialized dataset for a particular device and computational objective. The resulting fine-tuned model produces optimized inputs, such as circuits or microwave control pulses, that reduce gate times, gate errors, cross-talk, leakage, or gate counts when executing quantum algorithms. This approach enables large-scale model training without requiring quantum hardware during pretraining.

28 Claims, 3 Drawing Sheets

(51) Int. Cl.
*G06N 3/094* (2023.01)
*G06N 10/20* (2022.01)

(56) References Cited

U.S. PATENT DOCUMENTS

| | | | | |
|---|---|---|---|---|
| 12,062,080 | B2 * | 8/2024 | Shi | G06Q 30/0255 |
| 2009/0160698 | A1 * | 6/2009 | Wu | G01S 7/023<br>342/28 |
| 2018/0349605 | A1 * | 12/2018 | Wiebe | G06N 3/045 |
| 2020/0117764 | A1 * | 4/2020 | Zuccarelli | G06N 10/60 |
| 2020/0410384 | A1 * | 12/2020 | Aspuru-Guzik | G06N 3/047 |
| 2021/0089953 | A1 * | 3/2021 | Bocharov | G06N 10/60 |
| 2021/0326723 | A1 * | 10/2021 | Kumar | G06N 5/04 |
| 2021/0334700 | A1 * | 10/2021 | Nagaraja | G06N 10/60 |
| 2022/0108213 | A1 * | 4/2022 | Cao | G06N 3/045 |
| 2022/0114994 | A1 * | 4/2022 | Williams | G06N 10/20 |
| 2022/0147358 | A1 * | 5/2022 | Perdomo Ortiz | G06N 3/045 |
| 2023/0010142 | A1 * | 1/2023 | Zafrir | G06N 3/045 |
| 2023/0317202 | A1 * | 10/2023 | Stojevic | G16B 15/30<br>703/12 |
| 2024/0005203 | A1 * | 1/2024 | Chandelier | G06N 20/00 |
| 2024/0046137 | A1 * | 2/2024 | Low | G06N 10/20 |
| 2024/0062096 | A1 * | 2/2024 | Farquhar | G06N 10/80 |
| 2024/0303502 | A1 * | 9/2024 | Niu | G06N 3/045 |
| 2024/0420316 | A1 * | 12/2024 | Rajanna | G06T 7/0012 |
| 2025/0139487 | A1 * | 5/2025 | Elfving | G06N 10/20 |

FOREIGN PATENT DOCUMENTS

| | | | | |
|---|---|---|---|---|
| WO | WO-2024167659 | A2 * | 8/2024 | G06N 10/20 |
| WO | WO-2024232909 | A2 * | 11/2024 | G06N 3/088 |

OTHER PUBLICATIONS

Mir et al., “Diabetic Retinopathy Detection Using Classical-Quantum Transfer Learning Approach and Probability Model”, Oct. 2021, Computers, Materials & Continua, vol. 71 No. 2, pp. 3733-3746 (Year: 2021).*

Mari et al., “Transfer Learning in Hybrid Classical-Quantum Neural Networks”, Oct. 8, 2020, arXiv.com, pp. 1-13 (Year: 2020).*

Hu et al., “Quantum Generative Adversarial Learning in a SuperConducting Quantum Circuit”, Jan. 25, 2019, Science Advances, pp. 1-6. (Year: 2019).*

Horvat et al., “Universal Quantum Computation via Quantum Controlled Classical Operations”, Feb. 9, 2022, arXiv.com, pp. 1-11. (Year: 2022).*

Dong et al., “Learning Robust Control for Generating Universal Quantum Gates”, Jun. 20, 2016, arXiv.com, pp. 1-13. (Year: 2016).*

Carrasquilla et al., “Probabilistic Simulation of Quantum Circuits with the Transformer”, Dec. 23, 2019, arXiv.com, pp. 1-12 (Year: 2019).*

Jason Brownlee, “A Gentle Introduction to Generative Adversarial Networks (GANs)”, Jul. 19, 2019, pp. 1-9. (URL:https://machinelearningmastery.com/what-are-generative-adversarial-networks-gans/) (Year: 2019).*

* cited by examiner

SYSTEM AND METHOD FOR IMPROVING THE EFFICIENCY OF INPUTS TO QUANTUM COMPUTATIONAL DEVICES

TECHNICAL FIELD OF INVENTION

The following disclosure relates to the use of machine learning to improve the efficiency of quantum computation.

BACKGROUND OF THE INVENTION

Many quantum algorithms offer theoretical improvements in computational efficiency over their classical counterparts. Shor's algorithm, for example, provides a near-exponential reduction in the computational complexity of factoring integers into prime numbers. And Grover's algorithm offers a quadratic speed-up for unstructured search problems. If such algorithms could be implemented for large problem instances on quantum hardware, it would accelerate progress in many fields of scientific inquiry, including chemistry, biology, medicine, and finance.

In practice, quantum computational devices have made only modest experimental progress in achieving speed-ups. Part of the reason for the gap between theory and experimental implementation is that theory typically only accounts for constraints that are perceived to be fundamental. In particular, the theory that underlies many of the landmark theoretical results in quantum computation does not account for constraints such as thermal relaxation times and gate errors. These issues are often abstracted away from as short-run considerations. However, they currently place severe limitations on the computations that can be performed on quantum hardware. Consequently, many of the strongest theoretical results in quantum computation can only be implemented for problem sizes that are too small to benefit from the reduction in computational complexity.

Much of the effort in the field of quantum computation has been directed towards solving large instances of problems for which there are theoretically provable speed-ups on quantum computers. Hardware development, for example, is focused on escaping from the Noisy Intermediate Scale Quantum (NISQ) era. Furthermore, algorithms are often developed explicitly for the post-NISQ era, assuming that nothing other than a proof-of-principle demonstration will be feasible on near-term quantum devices.

An alternative to this approach is to improve the efficiency of inputs to existing hardware, extending the size of problems that are solvable in the NISQ era. For example, reducing the number of gates needed to execute an algorithm or reducing gate execution times could alleviate NISQ-era constraints, yielding a pathway to the solution of medium-sized problems. Even if the increase in the size of solvable problems was modest, it might be sufficient to allow for a speed-up of several orders of magnitude, which could have considerable scientific and commercial value.

At present, there are many approaches for improving the efficiency of inputs to quantum computational devices; however, they have not yet translated into general improvements in computational efficiency that can be applied to arbitrary problems and devices. For instance, optimal control can be used to recover an efficient microwave pulse for certain quantum operations on a superconducting circuit. In some cases, this can reduce the execution time for specific gates by an order of magnitude; however, the optimality of the pulse itself depends on the parameters of the quantum system, which drift over time, reducing generality and applicability.

Machine learning models have also been used to design more efficient inputs to quantum computational devices. One example is the generation of microwave pulses that implement gates in superconducting circuits. The machine learning approach provides a less effective, but more robust solution than optimal control; however, it relies on small, specialized models and often requires costly access to quantum devices to perform training. Furthermore, such models are typically trained on task-specific and device-specific training sets. This limits their applicability and their capacity to achieve general and substantial efficiency gains.

It is an objective of this disclosure to mitigate the aforementioned problems.

SUMMARY OF THE INVENTION

The field of machine learning was once centered around the development of small models using task-specific datasets; however, it has recently moved towards the development of large models that are pretrained on general tasks where samples can be generated automatically and inexpensively. Such models are sometimes called "foundation models," since they provide a base that can be developed into specialized models that perform tasks of interest, such as machine translation and image processing. This paradigm shift has enabled an increase in the scale of models by several orders of magnitude. It has also permitted the development of models that are less prone to overfitting and that embed information about an entire field of knowledge, rather than specific task.

The value of foundation models was first demonstrated with image processing applications, where base models learned general vision filters that could extract features from any image dataset. Foundation models were later introduced in natural language processing (NLP) after suitable training tasks and model architectures were identified. Within NLP, a base model often learns one or more languages. It can then be fine-tuned to perform specific language tasks, such as extractive question answering.

This specification describes techniques for developing quantum foundation models, which are machine learning models that are pretrained on general quantum computational tasks and calibration data from a family of quantum devices, primarily using classical processes and classical simulators. The training process and architecture of quantum foundation models is structured to allow for an increase in the number of model parameters and training data by orders of magnitude.

Similar to foundation models for NLP and image processing, quantum foundation models are general purpose base models that can be fine-tuned to perform downstream tasks. This disclosure will focus on the development of foundation models that generate high efficiency inputs to quantum computational devices. Examples of such inputs are quantum circuits or microwave pulses that increase the number of quantum operations that are feasible to execute given a device's physical constraints.

Different embodiments of quantum foundation models can be used to achieve better performance on certain families of quantum devices or for certain computational tasks. The drawings and detailed descriptions will discuss specific embodiments as examples and will outline a general method for the development of quantum foundation models.

BRIEF DESCRIPTION OF DRAWINGS

Like reference symbols and numbers indicate like elements.

DETAILED DESCRIPTION OF THE INVENTION

Figure 1:
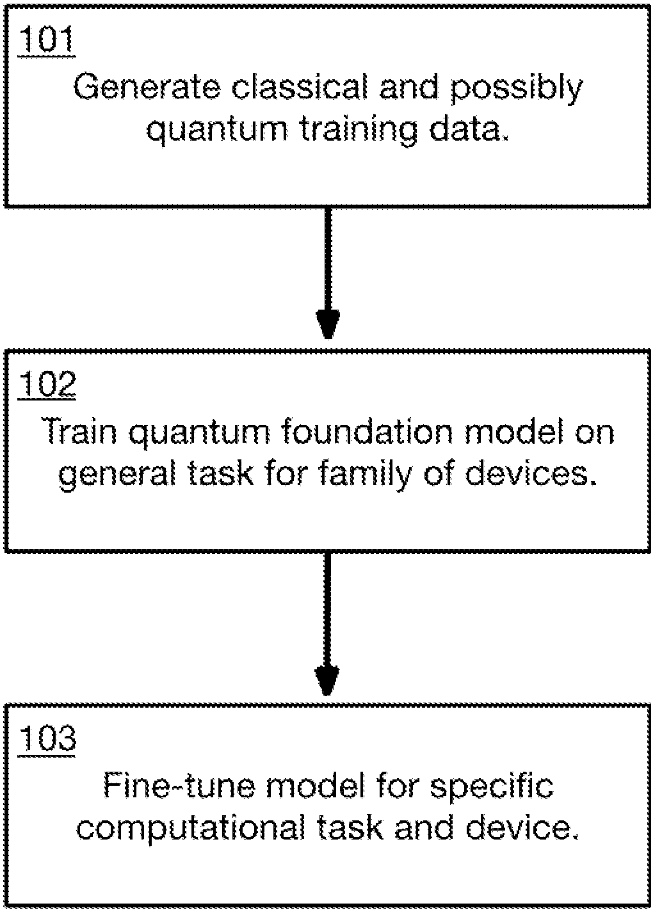
FIG. 1. is a high-level overview of the process for pretraining a quantum foundation model and fine-tuning it for a specific computational task.

The FIG. 1 describes a system for pretraining a quantum foundation model and fine-tuning it for a specific computational task. The system 101 first generates training data for a quantum foundation model. One embodiment would use a sequence of unitary matrices that represent the operations in a quantum circuit, topological data about a device in the targeted family of quantum devices, and calibration data for individual qubits and gates. This could include, for example, the set of basis gates, and their execution times and error rates for each qubit on a quantum processor.

The training data 101 characterizes a family of quantum devices and a sequence of quantum operations that could be executed on such a device. While there could be different embodiments that are structured to achieve an advantage for different problem types, a common characteristic is that the training process must be aimed at a broad, rather than narrow, computational task. In particular, it must be possible for training samples can be generated automatically and inexpensively. Furthermore, a quantum foundation model should be pretrained to embed general information about a family of quantum devices and their computational capacities. This is analogous to masked language modeling (MLM) for natural language processing, where models are pretrained to predict missing words in a sequence. MLM is not the intended end task for the model, but it facilitates automatic labelling of training data, allowing for an increase in the size of training sets and models by orders of magnitude.

The training data 101 is then passed to the model, which performs a general training task 102. The task is designed for an entire family of quantum computational devices, rather than an individual device or a subset of device components, such as individual qubits or pairs of qubits. In one embodiment, the training task will be carried out entirely with classical input data and classical simulators of quantum systems to avoid scaling issues that arise when there is dependence on access to quantum processing resources. Another embodiment would use a mixture of classical and quantum data during the pretraining process.

When the pretraining process 102 is complete, one embodiment of a quantum foundation model will then be fine-tuned for a specific computational task and for a specific computational device 103. This involves freezing all or most layers of the model, so that their parameters are not updated during the training loop. The model is then modified by appending a subnetwork, possibly including multiple neural network layers and a regression or classification head. The newly appended components of the model are then trained on data for a specific device and task. Another embodiment would instead use the output of the quantum foundation model as an input to separate model that is trained to perform a specific task and on a specific device.

Figure 2:
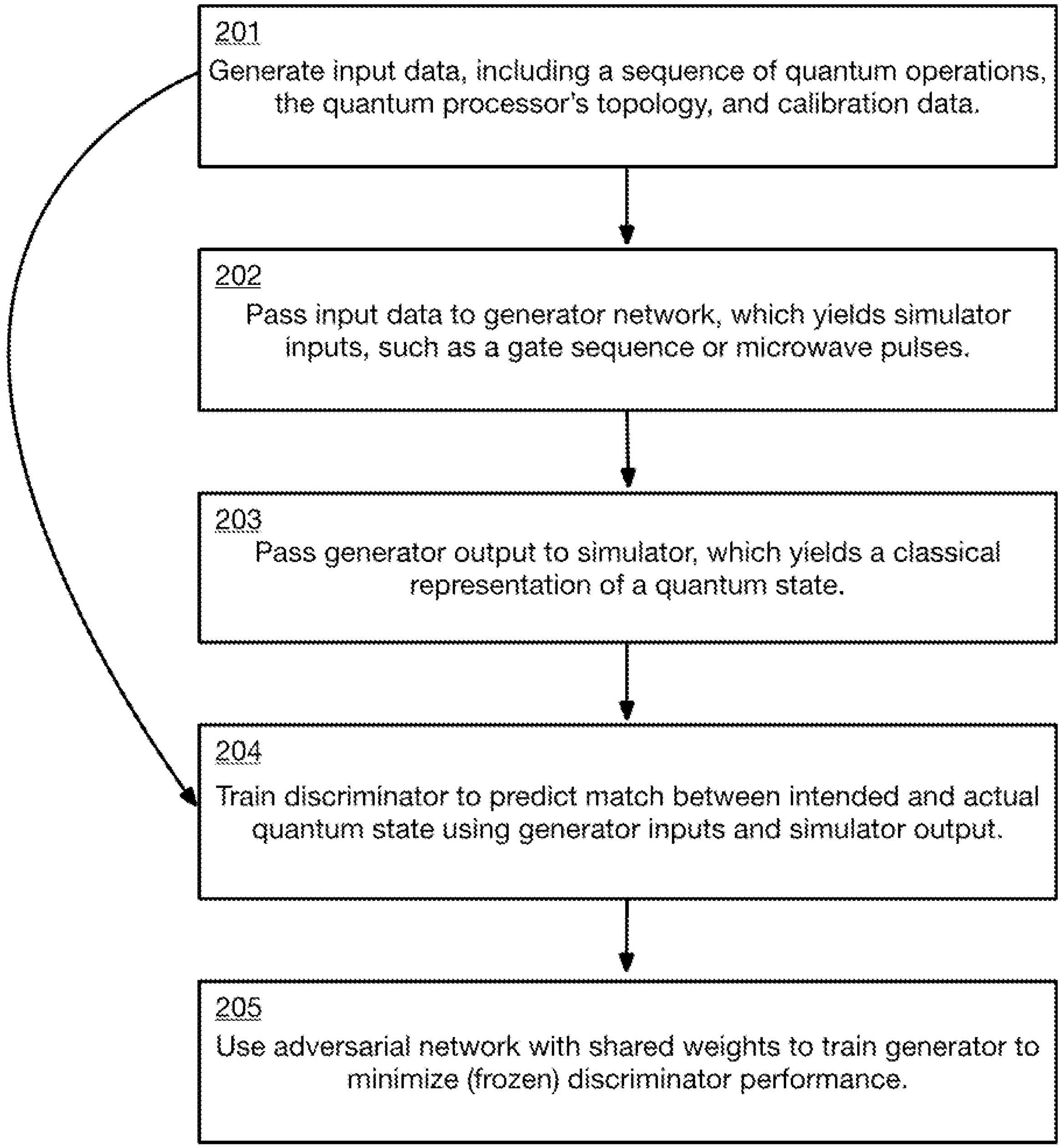
FIG. 2. is an example of a pretraining loop for a quantum foundation model.

The FIG. 2 illustrates an example pretraining loop for a quantum foundation model. Data is first generated 201 and includes a sequence of quantum operations, the quantum processor's topology, and gate calibration data. The specific embodiment considered uses a pretraining system for the foundation model that is based on a Generative Adversarial Network (GAN) architecture. The input data is first passed to a generator network 202, which produces inputs for a classical simulator. Such inputs might be sequences of gates or sequences of microwave pulses.

The generative network output is then passed to classical simulators of quantum systems 203, which produce outputs. In this embodiment, the simulators produce a classical representation of a quantum state. This state is then passed to a discriminator model 204, along with a subset of the input data to the generator. The model evaluates the quality of the state produced by comparing it to intended quantum state.

An adversarial model, which shares weights with the generator and a frozen version of the discriminator is used to train the generator 205. The adversarial model is trained to generate samples that the discriminator evaluates as high-fidelity representations of the target quantum state; whereas the discriminator learns to evaluate them accurately. The training loop is terminated when an evolutionary equilibrium is reached, where neither the discriminator nor the adversarial model achieves gains in reducing its loss.

Figure 3:
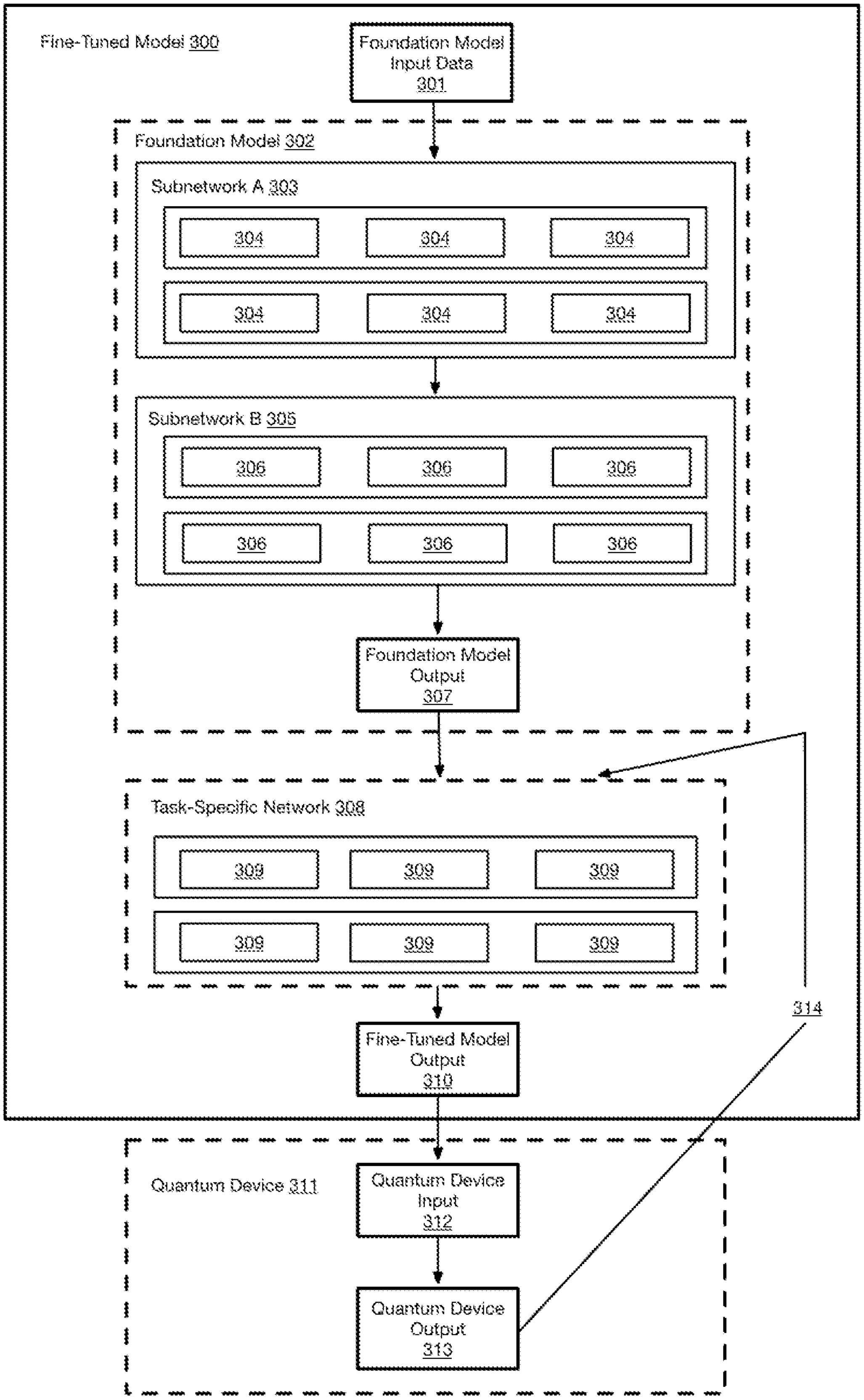
FIG. 3. is an example of the architecture of a type of quantum foundation model.

The FIG. 3 is an example of a system for fine-tuning a quantum foundation model 300. Input data 301 is first passed to the model 302, which may consist of one or more subnetworks. In the embodiment shown, the model contains two subnetworks. Subnetwork A 303 is a neural network that may contain one or more layers with one or more nodes 304. In the embodiment considered in FIG. 2, for example, this could correspond to the generative network.

Continuing with FIG. 3, the foundation model may contain additional subnetworks, such as Subnetwork B 305, which could, for example, represent the discriminator in a GAN-based training loop. Various embodiments, such as the one described in FIG. 2, may incorporate classical simulators into the training process for the foundation model.

For each set of inputs, a pretrained quantum foundation model produces a set of outputs 307. Without fine-tuning the model, these outputs 307 can be used as inputs to a model that performs a specialized task, such as reducing gate execution times or reducing cross-talk generated by microwave pulses.

In the specific embodiment considered in FIG. 3, the foundation model is fine-tuned to perform a specific computational task on a specific device 308. For example, the fine-tuning process might transform a foundation model that is trained on a general computational task for superconducting circuits into microwave pulse generator that reduces leakage for a superconducting circuit with a specific chip architecture. The fine-tuned model consists of one or more neural network layers 309, along with a classification or regression head, appended to the frozen foundation model. Different embodiments may use different network architectures to achieve better performance.

The fine-tuned outputs, which are yielded from the initial set of inputs to the quantum foundation model, can then be input 312 to a specific quantum device 311. The quantum device then yields an output 313. This can either be used as the final product of the process or as an input to the fine-tuning process 314.

The invention claimed is:

1. A computer-implemented method comprising:

obtaining training samples by automatically generating said samples for a pretraining task involving unitary matrices, circuits, or microwave pulses for a family of quantum devices:

pretraining a quantum foundation model with the training samples to embed information about the family of quantum devices and the pretraining task, fine-tuning the model with a specialized dataset to perform a specific computational task on a specific quantum computational device; and using the fine-tuned model to generate inputs to the quantum device, wherein the generated inputs reduce gate execution times, reduce gate errors, reduce cross-talk, reduce leakage, or reduce the number of gates needed to execute an algorithm on the quantum device.

2. The method of claim 1, wherein the quantum foundation model further comprises:

pretraining with a process that uses a generative adversarial model, the generative adversarial model comprising a generator and a discriminator, to evaluate the quality of states.

3. The method of claim 2, further comprising:

pretraining the foundation model with a structure that uses classical simulators to transform the generator output into a quantum state.

4. The method of claim 3, further comprising:

simulating quantum systems classically with different noise parameters, including but not limited to gate errors and thermal relaxation times.

5. The method of claim 1, wherein an output generated by the quantum foundation model after pretraining is used without fine-tuning.

6. The method of claim 1, wherein the quantum foundation model is not fine-tuned and its output is directly input into a specialized model.

7. The method of claim 1, wherein the generated quantum device inputs are a sequence of gates, a sequence of microwave pulses, or a sequence of unitary operations.

8. The method of claim 1, wherein the quantum foundation model has a neural network architecture.

9. The method of claim 1, wherein the quantum foundation model uses a transformer model architecture.

10. The method of claim 1, wherein the pretraining sample is prepared by generating random unitary matrices or random gate sequences.

11. The method of claim 1, wherein the pretraining sample is prepared by generating random microwave pulses and simulating them classically.

12. The method of claim 1, wherein the target family of quantum devices are superconducting circuits, ion traps, quantum annealers, or Boson samplers.

13. The method of claim 1, wherein the target family of quantum devices are universal quantum computers.

14. The method of claim 1, wherein the pretraining task involves generating unitary matrices, circuits, or microwave pulses.

15. A system comprising:

a classical processor; and a non-transitory computer-readable medium storing instructions that, when executed by the classical processor, cause the system to perform operations comprising:

obtaining training samples by automatically generating said samples for a pretraining task involving unitary matrices, circuits, or microwave pulses for a family of quantum devices;

pretaining a quantum foundation model with the training samples to embed information about the family of quantum devices and the pretraining task fine-tuning the model with a specialized dataset to perform a specific computational task on a specific computational device; and using the fine-tuned model to generate higher quality inputs to the quantum device, wherein the generated inputs reduce gate execution times, reduce gate errors, reduce cross-talk, reduce leakage, or reduce the number of gates needed to execute an algorithm on the quantum device.

16. The system of claim 15, wherein the quantum foundation model further comprises:

pretraining with a process that uses a generative adversarial model, the generative adversarial model comprising a generator and a discriminator, to evaluate the quality of states.

17. The system of claim 16, further comprising:

pretraining the foundation model with a structure that uses classical simulators to transform the generator output into a quantum state.

18. The system of claim 17, further comprising:

simulating quantum systems classically with different noise parameters, including but not limited to gate errors and thermal relaxation times.

19. The system of claim 15, wherein an output generated by the quantum foundation model after pretraining is used without fine-tuning.

20. The system of claim 15, wherein the quantum foundation model is not fine-tuned and its output is directly input into a specialized model.

21. The system of claim 15, wherein the generated quantum device inputs are a sequence of gates, a sequence of microwave pulses, or a sequence of unitary operations.

22. The system of claim 15, wherein the quantum foundation model has a neural network architecture.

23. The system of claim 15, wherein the quantum foundation model uses a transformer model architecture.

24. The system of claim 15, wherein the pretraining sample is prepared by generating random unitary matrices or random gate sequences.

25. The system of claim 15, wherein the pretraining sample is prepared by generating random microwave pulses and simulating them classically.

26. The system of claim 15, wherein the target family of quantum devices are superconducting circuits, ion traps, quantum annealers, or Boson samplers.

27. The system of claim 15, wherein the target family of quantum devices are universal quantum computers.

28. The system of claim 15, wherein the pretraining task involves generating unitary matrices, circuits, or microwave pulses.

* * * * *